United States Patent [19]

Sorbier

[11] 4,165,353

[45] Aug. 21, 1979

[54] METHOD AND APPARATUS FOR MOLDING ARTICLES FROM AGGLOMERATED PARTICLES

[75] Inventor: Pierre Sorbier, Pernes-les-Fontaines, France

[73] Assignee: Agence Nationale de Valorisation de la Recherche (ANVAR), Neuilly-sur-Seine, France

[21] Appl. No.: 756,000

[22] Filed: Jan. 3, 1977

[30] Foreign Application Priority Data

Jan. 9, 1976 [FR] France ................................ 76 00525

[51] Int. Cl.$^2$ ................................................. B29J 5/04

[52] U.S. Cl. .................................. 264/120; 249/119; 264/297; 425/359; 425/451.9

[58] Field of Search ............ 425/359, 360, 451, 451.9; 264/119, 120, 297, 236, DIG. 66, 325; 249/119

[56] References Cited

U.S. PATENT DOCUMENTS

| | | | |
|---|---|---|---|
| 2,622,302 | 12/1952 | Blecko | 264/297 |
| 3,078,506 | 2/1963 | Caughey | 425/359 X |
| 3,892,516 | 7/1975 | McGrew | 249/120 X |

*Primary Examiner*—Thomas P. Pavelko

*Attorney, Agent, or Firm*—Brisebois & Kruger

[57] ABSTRACT

Method for molding articles from agglomerated particles utilizes a press and a plurality of molds mounted to circulate in a closed path. After the pressing step a mold is aligned at one end of a row of molds, the row is placed under pressure and the articles therewithin caused to set. Simultaneously a mold is withdrawn from the other end of the row. The latter mold is then emptied, and the emptied mold returned to the press. The aligned molds are fastened together during the setting step. The invention includes apparatus for carrying out this process.

4 Claims, 13 Drawing Figures

16
15
17
25
25
13
14
9
9
18
19
22
8
8
2
14
15
12

16
15
24
17
23
13
18
2a
2b
19
8
2c
22
20
7
2d
21

METHOD AND APPARATUS FOR MOLDING ARTICLES FROM AGGLOMERATED PARTICLES

SUMMARY OF THE INVENTION

It is the object of the present invention to provide a method of molding articles from agglomerated particles and especially for molding the articles from agglomerated wood particles, preferably particles which are elongated in the direction of the fiber of which they are composed.

The invention also relates to a device for carrying out this process. There is a known process for manufacturing articles from agglomerated wooden particles with a small quantity of binder or resin which process consists in preparing batches of particles impregnated with binder, delivering these batches to a press having a compression chamber and a plurality of pistons acting in different directions which compress the particles of the batch, said chamber having an open face which is temporarily blocked by an intermediate mold which receives the compressed batch, after which the mold with its batch is brought to the rear end of a row of intermediate molds, the molds being so positioned that the rear surface of the proceeding mold compresses the material contained in the succceeding mold while polymerization is carried out in the entire row of molds. Each time that a new mold is brought to the rear end of the row, the first mold of the row is evacuated and the article removed from the mold.

This process is particularly appropriate to the rapid manufacture of objects of relatively small size, especially elongated wooden particles, since it permits very rapid operation of the press itself while leaving all the time necessary for setting or polymerization.

The present invention proposes to improve this process so as to permit simplification of the necessary apparatus in order to facilitate complete automation of the apparatus and assure the permanence of the necessary pressures in a simple way even if these have a high value, without the consumption of large quantities of energy.

It is an object of the present invention to provide a process for manufacturing articles from agglomerated particles and particularly agglomerated wooden particles, using a small quantity of binder, in which process batches of particles are prepared, delivered one by one to a press having a preferably vertical chamber, and one or more pistons capable of penetrating into the chamber to produce the compression. The chamber has an open face against which one temporarily maintains the front face of an intermediate mold destined to receive the article and a rear face which may or may not bear directly on the front face of the article. Compression is effected and then one brings the intermediate mold containing its article to the rear end of a row of molds and holds the articles in the molds of the row under pressure during setting or polymerization. The process is characterized by the fact that in order to put the last intermediate mold in place the row of molds is held in position, said intermediate mold is pushed against the last intermediate mold of the row by exerting a sufficient pressure thereagainst, and the last mold is positively attached to the preceding mold. Preferably the first mold is also removed from the row after having separated it from the second.

Preferably the row of molds subjected to polymerization is spaced from the press and means independent of the press are used to insure the compression of the material during the attachment of the last mold.

In an advantageous manner this compression is brought about by pushing the row of molds backwardly against abutment means and the recoil movement thus created is used to eliminate the connection between the first and second molds.

It is also an object of the invention to provide a device for carrying out this process in an installation comprising a press, means for feeding the press, and a recycling circuit for a plurality of intermediate molds, said circuit including means for forming a row of molds in which the material is maintained under pressure during polymerization said device being characterized by the fact that each mold has attaching means holding it in contact with the preceding mold, means being provided on the one hand to actuate these attaching means and to initiate attachment of the last mold of the row to the preceding mold and, on the other hand, to disconnect the first mold from the row with the succeeding mold, said device comprising also means for temporarily compressing the last mold against the row of molds.

Preferably said connecting or attaching means comprise one or more pivotally attached hooks carried by one of the molds and adapted to penetrate into a complementary part of an adjacent mold, and in this case the means for bringing about the attachment and detachment may advantageously comprise jacks, abutments, or ramps cooperating with the hooks.

The device according to the invention preferably includes, mounted on a frame, means for supporting a straight row of molds, a power jack mounted at the front of the frame to push the piston of the jack backwardly, an abutment situated at the rear of the frame to receive the rear face of the last mold, a second less powerful jack for pushing the row of molds forwardly, the frame also comprising different means for attaching and detaching the molds.

In an advantageous manner, the power jack may be adapted to travel along a substantial path at low pressure to push back the row of molds and then travel over a final path providing high pressure compression.

In an advantageous manner, the piston of the jack may have gripping means capable of gripping the first mold of the row to move this first mold of the column forwardly during the return movement of the jack toward the front. In this embodiment means are provided to cause the detachment of the first mold from the second during the movement of the row toward the rear under the pressure of the jack. In this case one may advantageously provide other gripping means cooperating for example with the free hook of the last mold of the row to hold the row stationary during the return movement to the front of the power jack and surely separate the first mold from the rest of the row.

In an advantageous manner the means for assuring the attachment and detachment may cooperate with rollers carried by the hooks to permit pivotal movement of the hooks about their axes.

The intermediate molds used may be of any type having a front part receiving the molded object and a rear part adapted to cooperate with the front part of the next mold to receive the front surface of the object but the device may advantageously be applied to the circulation of complex molds, for example in an installation making it possible to mold crates for vegetables or fruits in a single operation. Such intermediate molds advantageously comprise an outer cage and an inner core capable of being pushed through the chamber of the press to emerge before the front of the cage, the material being then compressed about the core and pushed with the core, into the cage.

In such an embodiment the device according to the invention may still comprise, downstream of the row, mold-emptying means comprising, for exmple, a jack capable of pushing, and preferably or drawing back, the core toward the outside of the cage and article gripping means fixed to the other side of the mold to grip the article so that during the return of the core into the cage the article is released.

Other advantages and characteristics of the invention will appear from a reading of the following description, given purely by way of example, with reference to the accompanying drawings in which.

Figure 1:
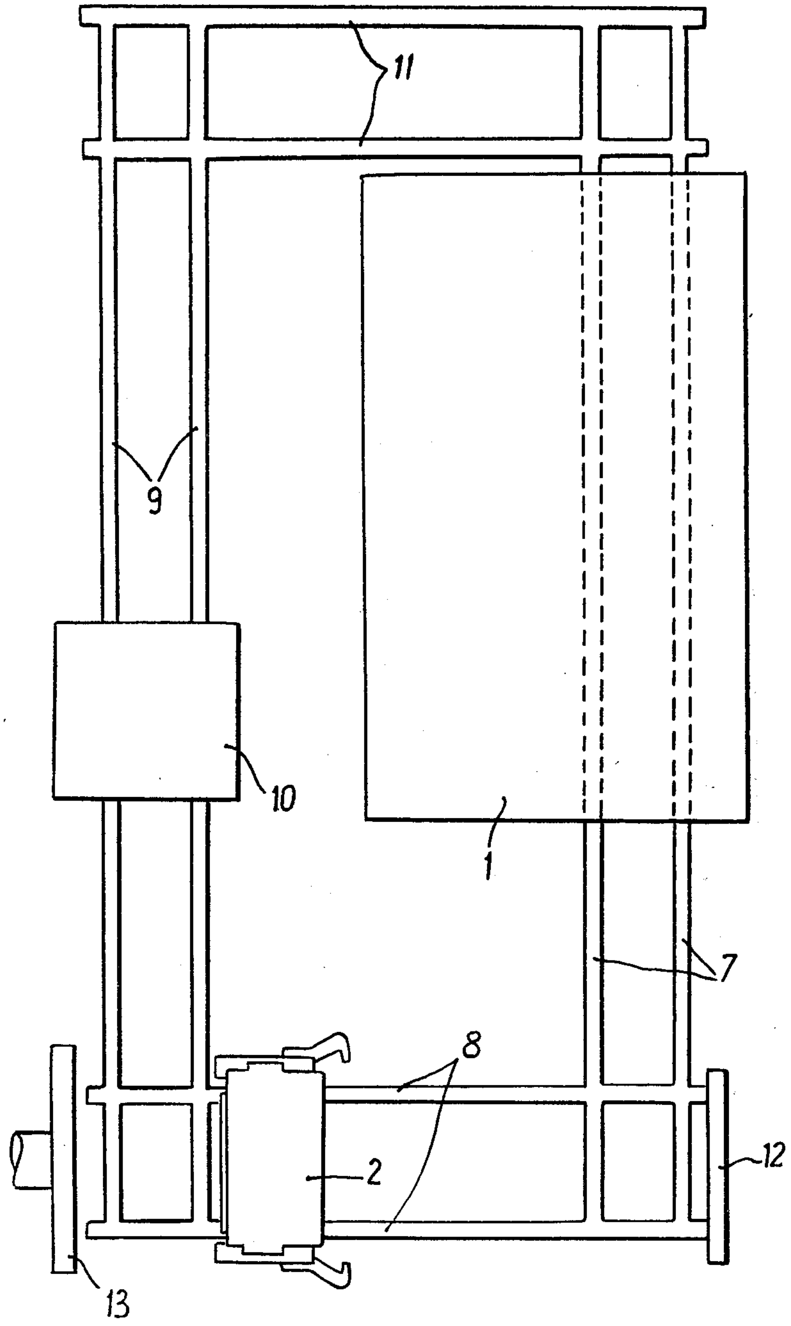
FIG. 1 is a schematic view of an installation comprising the device according to the invention.

Referring first to FIG.. 1, the installation comprises a press schematically indicated by reference numeral 1, for example of the type described in French Certificate of Addition 95386. This press makes it possible to successively supply a plurality of molds 2 the inner configuration of which is shown in greater detail on FIG. 10. The mold represented on FIG. 10 has a cage having substantially the form of a parallelopiped open at one of its ends. In this cage a core 3 can slide. The front face 4 of this core corresponds to the inner face of a vegetable crate 5. When the core has entered into the cage, it occupies the position shown in broken lines and it will be understood that, in this position, there is, toward the front, between the four internal lateral faces of the cage and the external lateral faces of the core 3 a space sufficient to contain the lateral walls 6 of the crate.

Figure 1A:
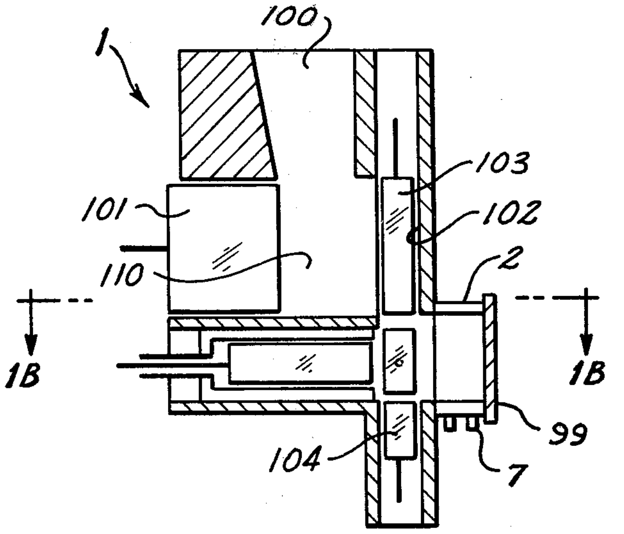
FIG. 1A is a schematic view in section taken along line 1A—1A of FIG. 1.
Figure 1B:
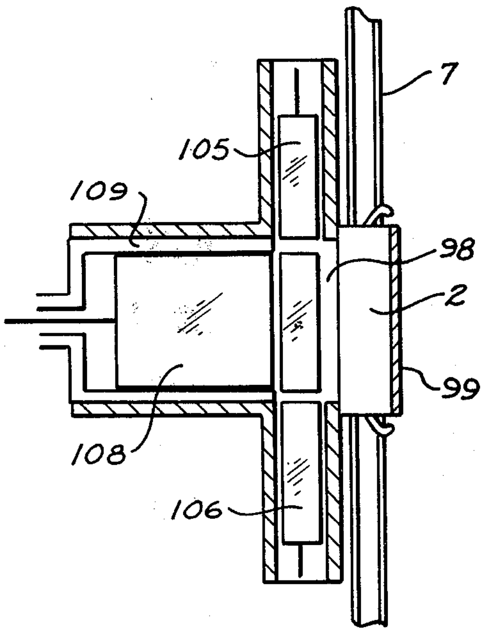
FIG. 1B is a view looking along line 1B—1B of FIG. 1A.

FIGS. 1A and 1B show in greater detail, the press described in Franch Certificate of Addition 95,386. As shown at FIGS. 1A and 1B, molds 2 are transported along rails 7 in front of press 1 to a position in front of a chamber 98. In this position mold 2 is in front of a back-up plate 99. Press 1 includes a hopper 100 above a transverse feed piston 101 which can be operated to move horizontally toward a chamber 102 containing a vertically movable feed-compressing piston 103. There is an additional compression piston 104 below chamber 98 and opposed to piston 103, and there are a pair of opposed compression pistons 105 and 106 (FIG. 1B) which move horizontally toward chamber 98. In opposed relation to mold 2 is a two-part piston including an inner piston 108 and an outer peripheral piston 109.

Piston 108 slides within piston 109 and can move independently of the piston 109. In the position of the assembly shown at FIG. 1A, hopper 100 is filled with a mass of the particles from which objects are molded, and the chamber 110 is therefore, also filled. Piston 103 is withdrawn as feed piston 101 is advanced so that the mass of particles in chamber 110 in front of piston 101 is transferred to chamber 102 below piston 103. Before piston 103 is lowered to the position shown at FIG. 1A, pistons 104, 105 and 106 are slightly withdrawn to provide additional space in chamber 98 in front of mold 2. The downward movement of piston 103 positions the material in front of mold 2. Next, piston 108 is advanced to compress the particulate material which will form the bottom of the article (such as bottom 5 of FIG. 10). Then, pistons 104–106 are advanced to compress the material around the sides of piston 108, thus initially forming the sides of the object (such as the sides 6 shown at FIG. 10). Then, the annular piston 109 is advanced to force the rectangular annulus of material contained between the sides of the piston 108 and the several pistons 103–106 into mold 2. Of course, mold 2 remains fixed during these compressing steps, and movement of the mold when pistons 108 or 109 are advanced is prevented by back-up plate 99. The several pistons are then withdrawn, and mold 2 is conveyed along track 7 to track 8, where it is in front of plate 12.

During the initial descent of piston 103, feed piston 101 simultaneously returned to the position shown at FIG. 1A, and a new charge of particulate material fell by gravity into chamber 110. When feed piston 103 was withdrawn at the end of the compression step, the new charge of material was transferred by piston 101 to the chamber 98 beneath piston 103. A new mold 2 is positioned opposite chamber 98 after pistons 108, 109, are withdrawn, and a new compression operation is initiated.

The different molds 2, only one of which is shown on FIG. 1, circulate along a closed circuit comprising a first pair of rails 7 permitting translational movement of the mold 2 in the press 1, a second pair of rails permitting movement of the mold 2 perpendicularly to the rails 7, a third pair of rails 9 parallel to the rails 7 and passing a mold-emptying station, and a fourth pair of rails 11 to return the mold to the rails 7.

The row of molds rests during the polymerization on the pair of rails 8 and FIG. 1 shows schematically at the rear end of the rails 8 an abutment 12, and at the front end of the rails 8 the piston of a hydraulic jack carrying a plate 13.

Figure 2:
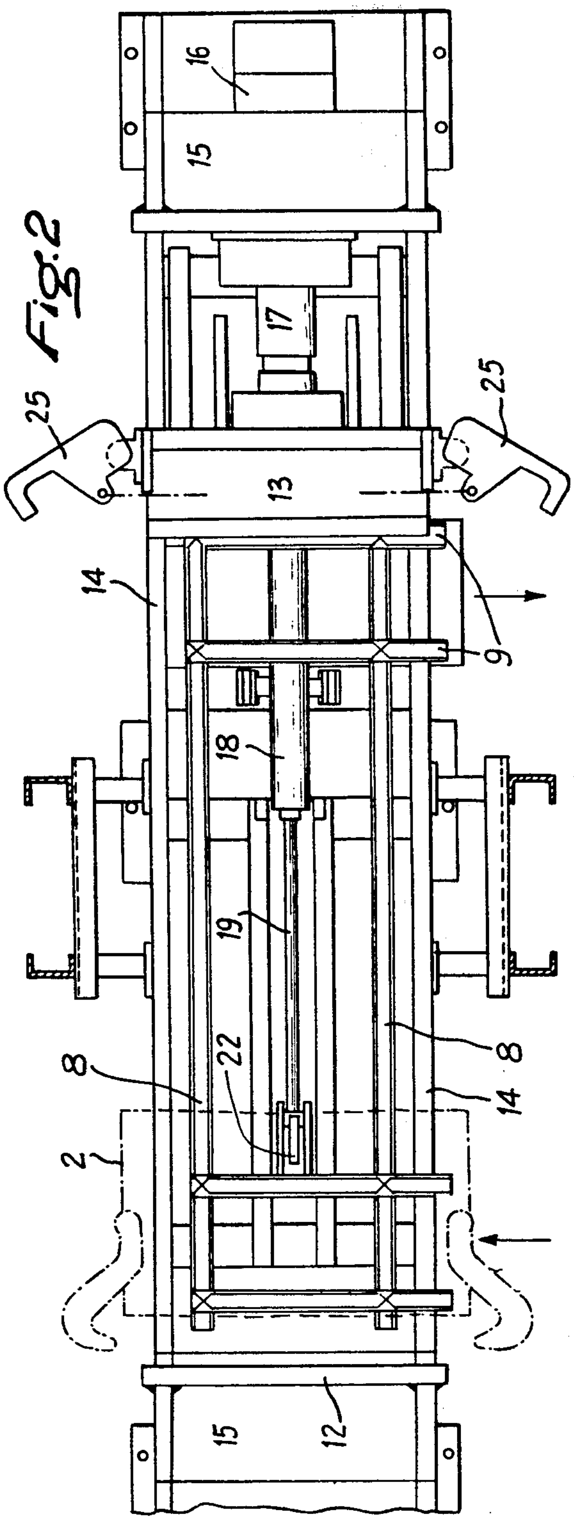
FIG. 2 is a top plan view of a part of the device according to the invention.
Figure 3:
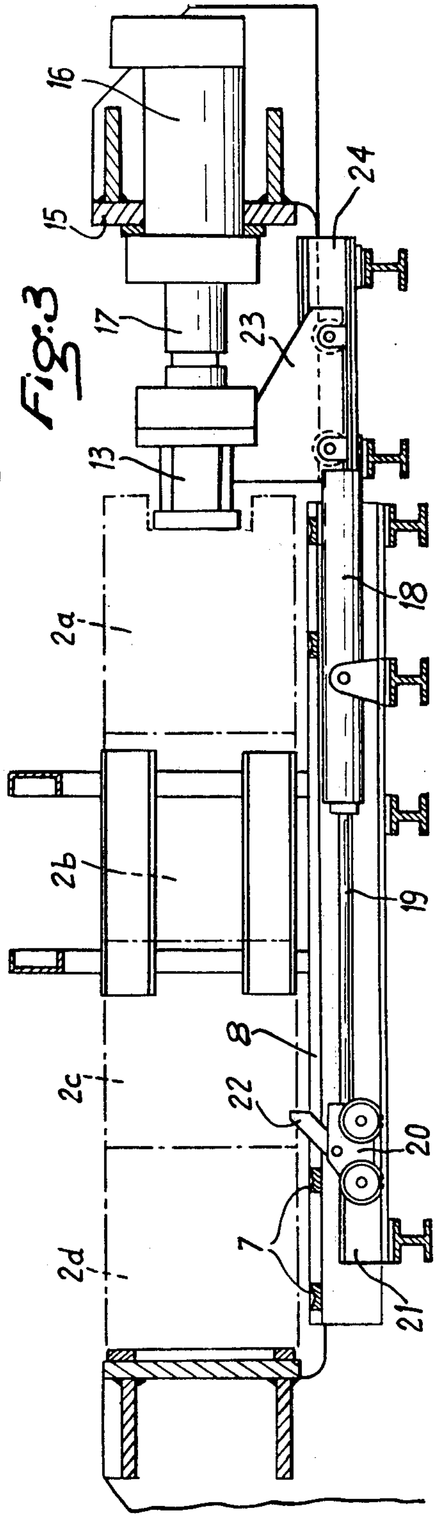
FIG. 3 is an elevational view of the part shown in FIG. 2.

Referring now to FIGS. 2 and 3 these figures show in a more detailed manner the part of the path of travel which takes place over the rails 8, on which polymerization takes place.

Figure 4:
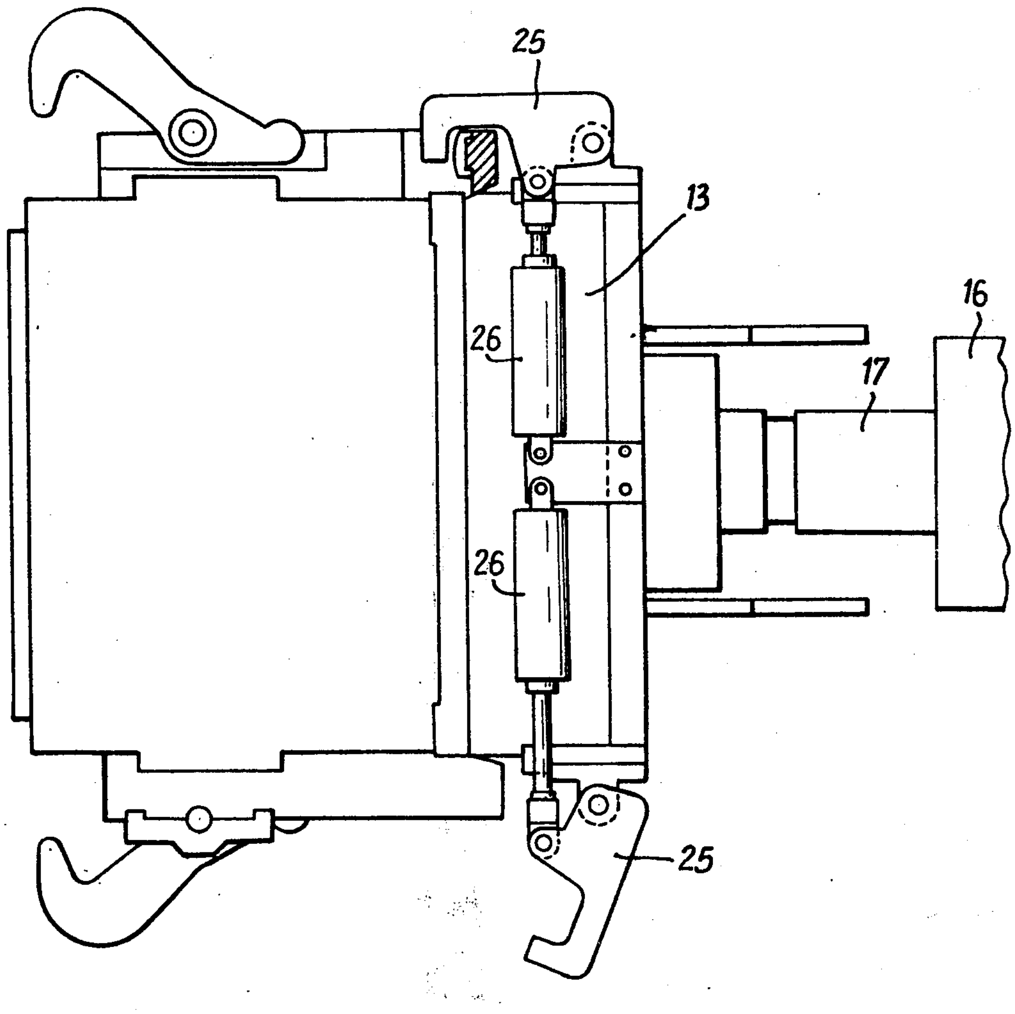
FIG. 4 is a top plan view of the piston of the power jack gripping an intermediate mold.

The device comprises at this level a strong frame comprising particularly the longitudinal members 14 and transverse members 15. At the rear end, behind the rails 8, is the abutment 12. The frame has at its front part a jack 16 having a very high power, the rod 17 of which supports the plate 13 which is seen in detail on FIG. 4. The device also comprises, beneath the rails 8, a weaker jack 18 the rod 19 of which is connected to a carriage 20 sliding on a rail 21 and having a movable catch 22. Finally the figure shows that the head 13, by reason of its weight, is supported by a carriage 23 which slides on a short rail 24. Moreover, the plate 13 has two gripping hooks 25 capable of pivoting about vertical axes when actuated by jacks 26 carried by the head 13.

Figure 5:
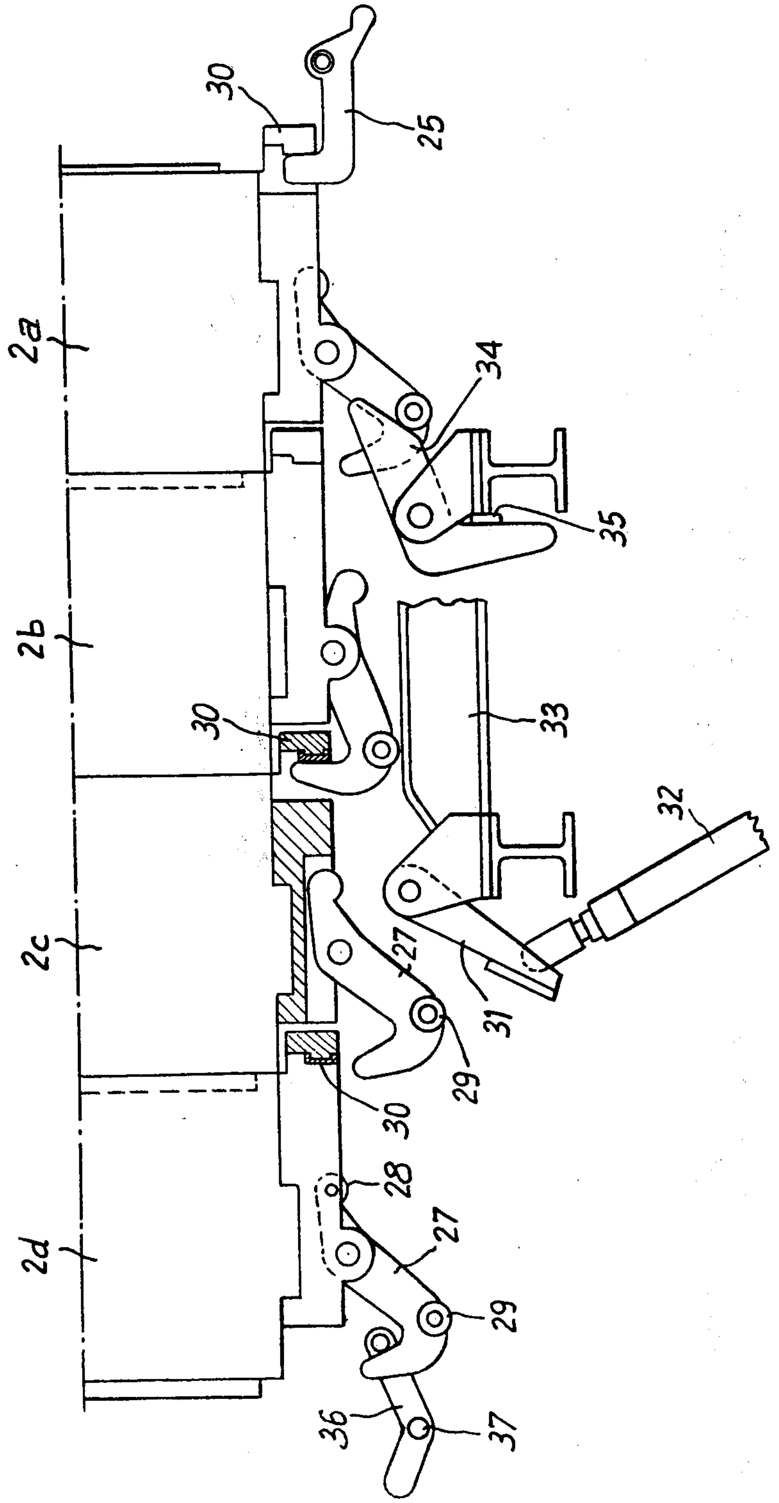
FIG. 5 is a top plan view of a row of molds with the means for attaching them to each other.
Figure 6:
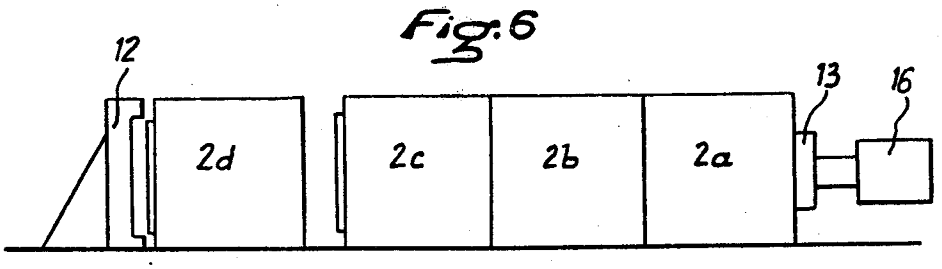
FIGS. 6–9 are schematic views illustrating different stages of the process according to the invention.
Figure 7:
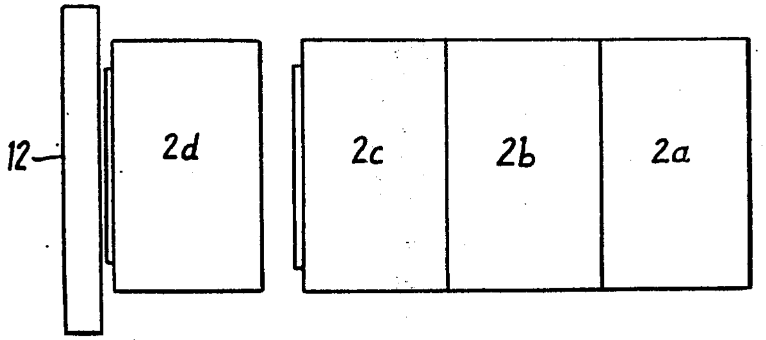

Referring more particularly to FIG. 5 this shows that each mold has a lateral hook 27 capable of pivoting about vertical axes and having a projecting arm with a roller 28 while the arm which carries the hook itself has a roller 29. These hooks are capable of catching behind extensions 30 carried at each side by the upper part of the mold so that when these hooks are in place the two adjacent molds are firmly held against each other.

Means for attaching the hooks to or detaching them from the molds comprise firstly, on opposite sides of the rails 8, hooking arms 31 capable of being driven by a pivotal jack 32 to act under the pressure of the jack against the roller 29 to urge the hook 27 into contact with the rear face of the extension 30. These means also comprise, on opposite sides of the row, a rail 33 which prevents inopportune opening of the hook 27 bearing against the extension 30. Finally on opposite sides of the rail 8 are catches 34 movable about a horizontal axis, these catches being capable of being swung out of the way when the mold 2 travels forwardly. When they return to their rest position they resist the return to the rear of the hooks of the mold and if this return movement to the rear continues the catches 34 immobilized against their abutments 35 act on the rollers 29 to open the hook and cause detachment.

Finally at the rear part there is a hooking arm 36 capable of pivoting about a pin 37 under the influence of a suitable jack (not shown). This hooking arm 36 is capable of gripping the hook 27 when the latter is in open position to prevent forward movement of the mold 2.

The operation, which is best shown on FIGS. 6–9 is as follows. While a mold 2*d* is positioned at the level of the press 1, three molds 2*a*, 2*b*, 2*c* are situated on the rails 8 and undergoing polymerization. The three molds 2*a*, 2*b*, 2*c* are attached to each other and are situated in the position shown on FIGS. 6 and 7, that is to say, with the mold 2*a* resting against the face of the plate 13, the jack 16 being in retracted position. There is thus a large space between the rear face of the mold 2*c* and the abutment 12. When the mold 2*d* has received the agglomerated article, it is displaced the length of the rails 7 so as to come into position above the rails 8 in the position shown on FIGS. 6 and 7. In this position this mold 2*d* is slightly spaced from the abutment 12. The jack 16 is then actuated and in a first rapid path of travel at low pressure the plate 13 drives the three molds 2*a*, 2*b*, 2*c* toward the rear in the direction of the arrow F, into contact with the mold 2*d* and it will be understood that the rear part of the mold 2*c* comes into contact with the front surface of the material contained in the mold 2*d*. This pressure brings the rear surface of the mold 2*d* into contact with the abutment 12 as shown on FIG. 8 and at this moment the jack is placed under high pressure and presses the mold 2*c* against the mold 2*d* while compressing the material contained inside the mold 2*d*.

The molds 2*c* and 2*d* being thus in direct contact, the jack 32 is actuated and the hooks 27 of the mold 2*c* are positioned against the extension 30 of the mold 2*d* which is thus locked in place. Moreover, during the movement provoked by the jack moving toward the rear, the hook 27 of the mold 2*a* is brought by its roller 29 into abutment against the movable catch 34 as may be seen on FIG. 5 and the catch 34 opens the hook of the mold 2*a*, which is no longer attached to the mold 2*b*, but is urged against it by the pressure of the jack. Simultaneously the hooks 25 of the plate 13 are brought into place against the projections 30 of the mold 2*a*. During this time the hooks 27 of the mold 2*b* are prevented from opening by the presence of the corresponding rails 33.

Finally the jack which controls the hooking arm 36 is actuated and this hooking arm reaches the position shown on FIG. 5.

Figure 8:
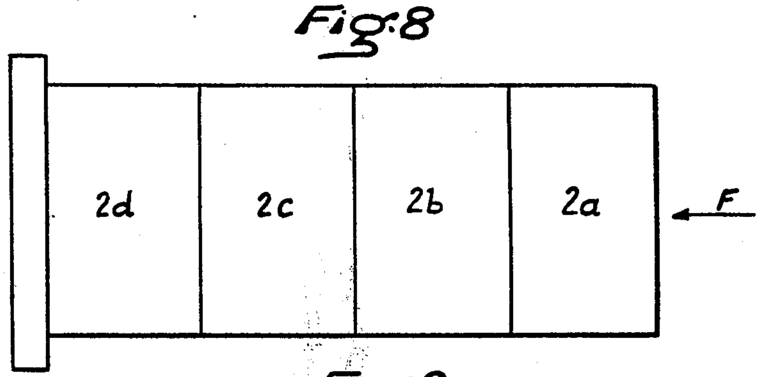
Figure 9:
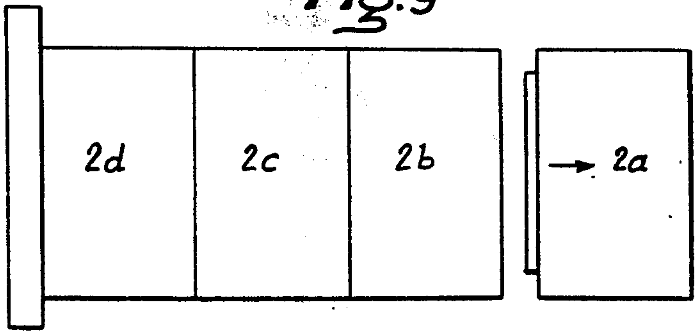

From the position on FIG. 8 one now reverses the direction of movement of the jack 16 which moves rapidly at low pressure toward the front. In this return movement the plate 13 only drives the mold 2*a* through the gripping hooks 25 since the three molds 2*b*, 2*c*, 2*d* are locked together. Moreover the mold 2*d* is hooked to the arm 36 and thus cannot move when the mold 2*a* is separated from the adjacent mold and returned to the front. At this moment the arm 25 separates and the mold 2*a* is removed on the rails 9 to be brought to the mold-emptying station 10. The jack 18 is then actuated. This jack is in the position shown on FIG. 3 and the catch 22 which bears against a suitable part of the mold 2*c* drives the column formed by the molds 2*b*, 2*c*, 2 *d* frontward until the front face of the mold 2*b* comes into contact with the plate 13 in the position shown for the mold 2*a* on FIG. 6. A new mold may then be brought in front of the abutment 12 and this cycle is recommenced.

Figure 10:
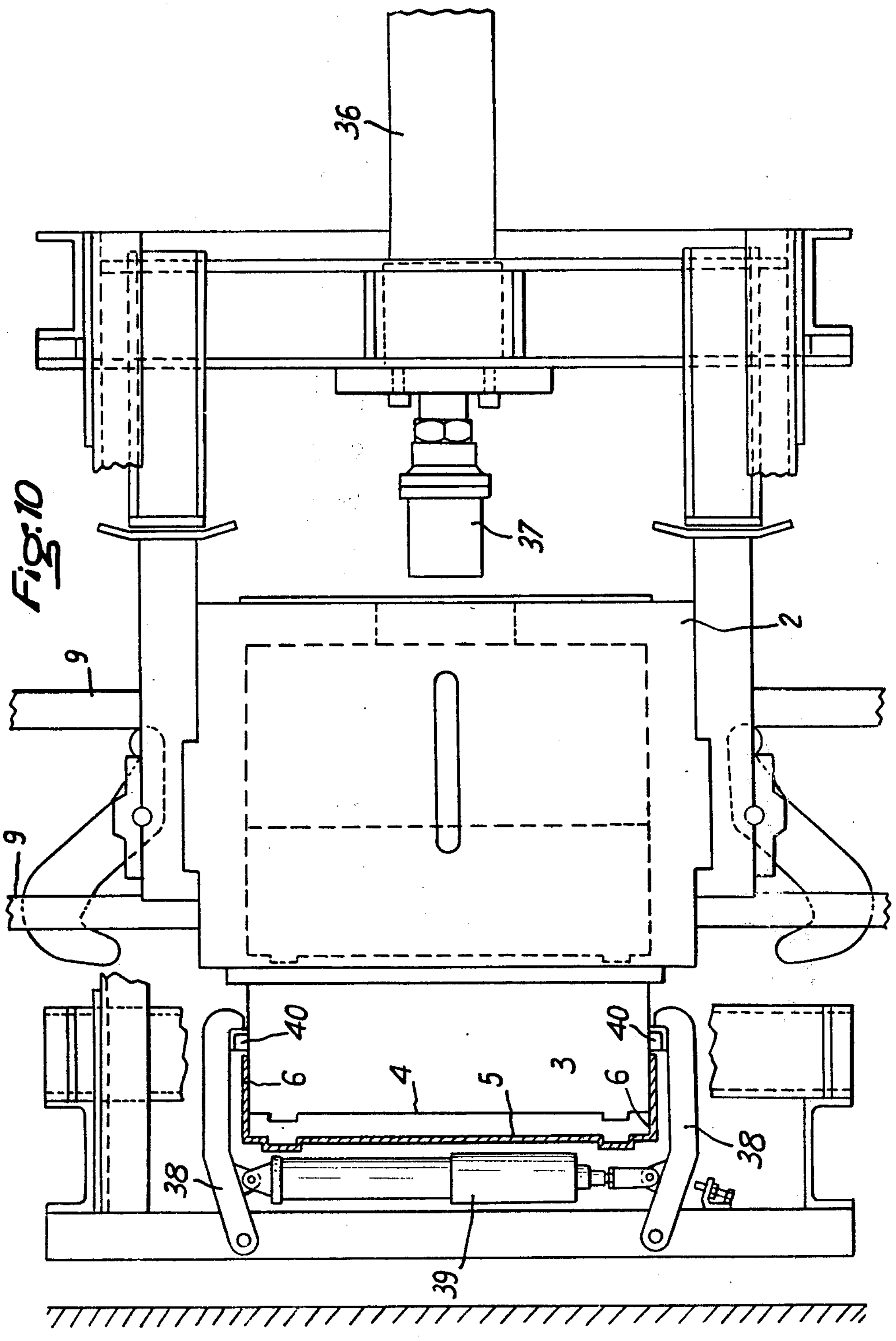
FIG. 10 is a top plan view of a mold emptying station according to the invention.
Figure 11:
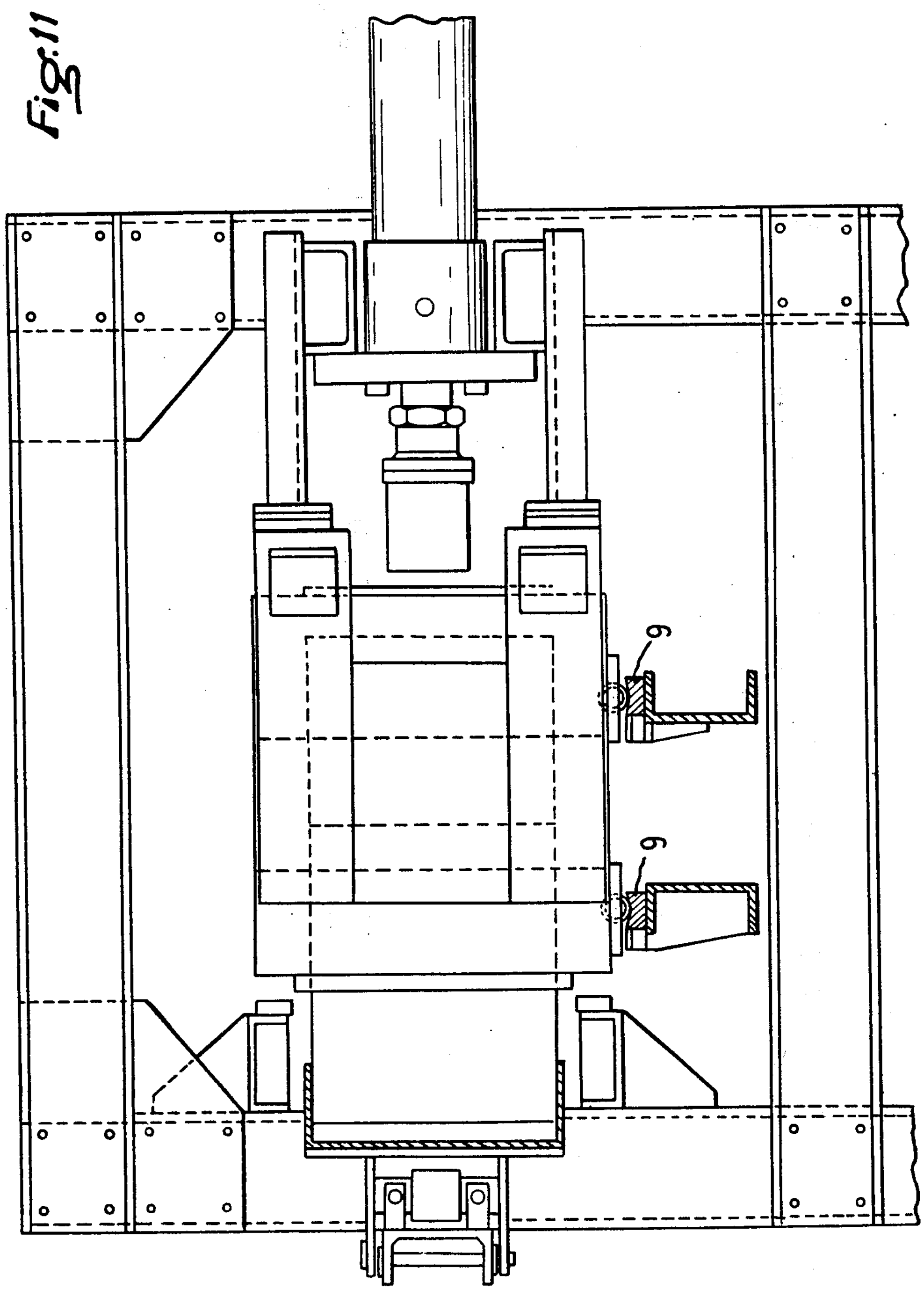
FIG. 11 is a front view of this station.

Please refer now to FIGS. 10 and 11.

The mold 2*a* which has been brought to the station 10 is immobilized on the rails 9. It is then opposite a transverse jack 36 the rod of which carries a magnetic head 37. When the jack 36 is actuated, the head 37 penetrates through an orifice located in the front face of the cage of the mold to bear against the core 3 which, from its internal position shown in broken lines, is returned to an emerging position shown in solid lines. The core brings with it the crate 5 and when the core has arrived in its advanced position two pivoting arms 38 are brought toward each other by a pivotally mounted jack 39 said arms carrying vertical bars 40 which come into position against the lateral vertical faces of the core behind the sides of the cage 6. The jack 36 is then actuated in the opposite direction and the magnetic head 37 returns the core to the inside of the cage of the mold while the arms 38 with their bars 40 prevent the crate from following this movement and the crate is then removed from the mold and may be evacuated.

Of course the invention is not limited to the particular embodiment described and various modifications or variations thereof may be made.

Moreover, it is obvious that instead of using rails on which the intermediate molds roll, through intermediate rollers, other means of transport such as belts or carriages may be used.

It will also be understood that the polymerization of the molds when they are on the rails 8 in a row hooked to each other may be carried out by various means, such for example as a heating tunnel, or by means of direct resistances incorporated in the various intermediate molds.

What is claimed is:

1. In the method of manufacturing articles from agglomerated particles which comprises the steps of preparing batches of particles, delivering the batches one by one to a press comprising a chamber having an open face against which one temporarily maintains the front face of one of a series of molds adapted to receive the article and having a rear face adapted to press a corresponding article received in another of said molds, carrying out the compression in said press, bringing the mold containing its article to the rear end of a row of molds, and maintaining the articles in the molds in the row under pressure during polymerization, the improvement according to which, in order to introduce said one mold into said row and to obtain and maintain said pressure, the row of molds is held in position, said one mold being introduced to the row is urged against the last mold already in the row in order to press the article in said one mold, and during said urging action the two last-mentioned molds are positively attached to each other to keep aid article under pressure between the front face of said one mold and the rear face of the last mold already in the row.

2. Process as claimed in claim 1 in which said one mold to be introduced into the row is laterally separated from the press and transported toward the row.

3. Process as claimed in claim 1 in which the row of molds is pressed toward the rear against abutment means and the recoil movement thus created is used to eliminate the attachment between a first mold and a second mold of the row.

4. Process as claimed in claim 3 in which the mold being introduced is brought behind the last mold of the row, the row thus completed is pressed against the abutment means, the mold last introduced is attached to the preceding mold and the first mold in the row is detached from the next, the first mold is brought forward to empty it and the remainder of the row is brought forward so as to be spaced from the abutment means.

* * * * *